2,846,420

EMULSION POLYMERIZATION OF BUTADIENE COMPOUNDS

Herbert L. Johnson, Media, and Stanford J. Hetzel, Newtown Square, Pa., assignors to Sun Oil Company, Philadelphia, Pa., a corporation of New Jersey No Drawing. Application March 12, 1956
Serial No. 570,723

10 Claims. (Cl. 260—82.1)

This invention relates to the polymerization of butadiene compounds in aqueous emulsion, and more particularly to such polymerization in the presence of an emulsifying agent comprising saponified products of oxidation of petroleum fractions.

It is well known that butadiene-1,3 compounds and mixtures thereof with other monomers can be polymerized in aqueous emulsion to produce synthetic rubber latices which can be coagulated to yield synthetic rubber. Synthetic rubber-like materials have been prepared by polymerizing, in aqueous emulsion, butadiene-1,3, halogen derivatives thereof, or other substituted butadiene-1,3 compounds, or by inter-polymerizing the above with other compounds containing a vinyl group such as styrene, acrylic acid esters, acrylic acid nitrile, vinyl chloride, etc.

In emulsion polymerization of butadiene-1,3 compounds, it is customary to employ an emulsifying agent having the property of forming an emulsion of hydrocarbon materials with the aqueous phase of the polymerization mixture. It is believed that the emulsifying agent performs an important function in the polymerization reaction in that it forms micelles in the polymerization mixture in the interior of which micelles the polymerization reaction takes place. The nature of the emulsifying agent is an important determining factor in the speed at which the polymerization takes place. The choice of emulsifying agent is therefore an important matter in emulsion polymerization.

Previously, alkali metal soaps of naturally occurring fatty acids have been employed as emulsifying agents in emulsion polymerization of butadiene-1,3 compounds. In polymerization at 122° F., a commonly used emulsifying agent has been "KORR Soap," a mixture of potassium soaps of hydrogenated tallow acids predominating in acids having 18 carbon atoms per molecule. Mixtures of soaps have been regarded as generally more satisfactory than the pure components. Such mixtures, however, have the disadvantage of often resulting, particularly when used at relatively low polymerization temperatures, in gelation or flocculation of the polymer prior to the completion of the polymerization. Polymerization of the reaction mixture is generally carried out to a predetermined extent of conversion of monomers, and the mixture is then subjected to further treatment involving stripping of unreacted monomers, latex coagulation, etc. It is generally undesirable that preflocculation, i. e. precipitation of solid polymer in the reaction mixture prior to monomer stripping and subsequent steps, should occur, since the precipitated polymer has undesirable effects in the subsequent processing, as well as in the polymerization itself and in the nature of the synthetic rubber product. The undesirable effects of preflocculation are discussed, for example, in G. S. Whitby et al. "Synthetic Rubber" (1954), at pages 198 and 280.

According to the present invention, emulsifying agents for emulsion polymerization of butadiene-1,3 compounds are provided, which are free of the excessive preflocculation characteristics exhibited by prior art emulsifying agents such as KORR Soap, and which are capable of providing polymerization rates faster than those provided by prior art emulsifiers including fatty soaps and rosin soaps. The emulsifying agent employed according to the present invention is prepared from products obtained by partially oxidizing a petroleum fraction to obtain an acidic material comprising carboxylic acids. This acidic material is generally associated in the oxidation products with substantial quantities of unsaponifiable material, comprising unoxidized petroleum, and it is preferred to remove from the oxidation products at least a portion of the unsaponifiable material to obtain the acidic saponifiable material in concentrated "deoiled" form, and preferably containing not more than 15 percent unsaponifiable material. The resulting deoiled material is, in a preferred embodiment, advantageously further treated as subsequently more fully described.

Any suitable petroleum fraction can be employed as the charge material for the oxidation step. Generally, to provide suitable oxidation products for preparation of an emulsifier as contemplated here, the petroleum fraction should have average molecular weight within the approximate range of 200 to 450; preferably the average molecular weight is within the approximate range 250 to 400. Partial oxidation of such petroleum fractions generally results in the production of substantial amounts of carboxylic acids having 12 to 26 carbon atoms, some splitting of molecules occurring during the oxidation. Petroleum fractions having the proper molecular weight may include gas oil and lubricating oil fractions, and other fractions such as the foots oil fraction and the slack wax fraction which are subsequently more fully described. The latter fractions are preferred for use according to the invention because their use provides economical and highly satisfactory results.

The oxidation charge preferably contains an average of at least 0.4 naphthenic rings per molecule, since the resulting oxidation products provide particularly good soaps for use in emulsion polymerization of butadiene compounds.

The oxidation charge preferably contains small enough proportions of aromatic compounds so that there is no substantial inhibition of the oxidation reaction by aromatic materials. The maximum allowable amount of aromatics in the oxidation charge varies with the molecular weight of the charge, and the proper amount can be determined by a person skilled in the art. A helpful discussion of the effect of aromatic content on various oxidation charges may be found in U. S. Patent 2,395,627, issued February 26, 1946, to Herbert L. Johnson and John Harold Perrine. Any suitable method, e. g. acid treating or solvent refining, can be used if necessary to reduce the aromatic content of a particular fraction to the proper amount.

Any suitable oxidation method can be employed. For example, air or other oxygen-containing gas can be bubbled through the petroleum fraction at elevated temperature in the presence of a catalyst, e. g. manganese, nickel, or cobalt naphthenate; manganese, nickel, or cobalt oleate; manganese, nickel, or cobalt salts of acids obtained in previous oxidations of petroleum fractions, etc. The use of such catalyst can be dispensed with, however, if recycle oil from previous oxidations of petroleum fractions is used as a portion of the oxidation charge. With some charge stocks, no catalyst or recycle oil is required. The oxidation can be carried out at any suitable pressure, such as atmospheric or elevated pressure, preferably not greater than about 100 p. s. i. gauge. Oxidations at relatively low pressures may result in a product containing lesser amounts of relatively low molecular weight products than oxidations at higher pressure, because of the lesser tendency in the low pressure oxidations for the low molecular weight products to be retained in the liquid phase rather than being removed from the oxidation zone with vent gases. Generally, it is preferred to conduct the oxidation at atmospheric pressure because such operation is more economical, and because the low molecular weight products which escape with the vent gases generally have too low molecular weight for satisfactory incorporation in the emulsifying agent prepared from the oxidation products.

Preferably, the oxidation is terminated when the oxidation products have a saponification number within the approximate range 50 to 125; preferably, when the oxidation is performed under atmospheric pressure, the oxidation is terminated before the saponification number rises above 100. The time required to obtain such saponification number depends on the nature of the charge stock and the oxidation conditions, and a person skilled in the art can readily determine when the desired saponification number has been obtained.

The oxidation products are, according to the present invention, treated for removal of at least a portion of the unsaponifiable material therein. This can be accomplished, for example, by saponifying the entire oxidation product and contacting the saponified product with a selective solvent, e. g. petroleum naphtha, for the unsaponifiable material. The extraction can, if desired, be performed in the presence of a solvent for the saponified material, e. g. aqueous isopropanol or similar solvents.

The raffinate obtained, comprising alkali metal soaps of saponifiable oxidation products, can be used without further treatment as emulsifying agent in emulsion polymerization, but preferably it is first acidified to obtain the corresponding acidic oxidation products, and after removal of solvent, the acidified material is distilled to obtain a distillate fraction of the acidic oxidation products, which fraction is then saponified to obtain the emulsifying agent according to the invention.

The above distillation performs two valuable functions. First, it separates relatively low molecular weight acidic products from relatively high molecular weight acidic products (e. g. containing more than 26 carbon atoms), the latter remaining in the residue. Generally, the low molecular weight products provide, in the form of soap, more rapid polymerization rates in emulsion polymerization of butadiene compounds. Second, the distillation probably results in decomposition of certain constituents of the acidic oxidation product, which constituents contain more oxygen per molecule than a monocarboxylic acid, to form less highly oxygenated compounds such as monocarboxylic acids whose molecules contain little or no oxygen other than that in the carboxyl group. Soaps of such monocarboxylic acids generally provide much more rapid polymerization rates than soaps of the more highly oxygenated acidic products, which generally include hydroxy-acids, polycarboxylic acids, aldehyde-acids, keto-acids, ester-acids, lactones, etc.

The extent to which the distillation is preferably carried varies according to the nature of the oxidation charge and the oxidation conditions. Generally, it is preferred that the endpoint of the distillation be not substantially greater than 550° F. at 3.5 mm. Hg. The amount of distillate, relative to the distillation charge, is preferably at least 5 volume percent, more preferably at least 20 volume percent, and may be as great as 90 percent or more.

Although it is generally true that relatively low molecular weight acidic oxidation products provide faster polymerization, as soaps, than relatively high molecular weight acidic oxidation products, it is also true that it is advisable to exclude some of the lowest boiling acidic oxidation products (e. g. those having less than 12 carbon atoms per molecule), in order to obtain rapid rates in polymerizations in which the soaps are used as emulsifiers. Accordingly, it is preferred that the distillate obtained should have an initial boiling point of at least 150° F. at 1 mm. Hg.

In one advantageous embodiment of the invention, the oxidation products may be partially hydrogenated in order to obtain hydrogenated oxidation products which are highly suitable for use in emulsion polymerization. The hydrogenation should be done with the oxidation products in the form of esters or alkali metal soaps, in order to prevent excessive decarboxylation of the acidic products. Suitable hydrogenation conditions include temperatures in the range 150° C. to 300° C., pressures in the range 150 to 4500 p. s. i. g., and reaction periods of 0.5 to 10 hours. Any suitable hydrogenation catalyst can be employed if desired. The hydrogenation conditions are those under which there is no excessive decarboxylation of the acidic materials.

Other treatments of the oxidation products can be employed if desired. For example, treatment with sulfuric acid is beneficial in that some constituents of the oxidation products which would otherwise inhibit the subsequent emulsion polymerization are removed in the acid sludge. Also, it may be beneficial to heat the saponified oxidation products to vaporize water therefrom, since the water vapor carries off with it materials which would otherwise inhibit the emulsion polymerization. Also, it may be beneficial to extract the acidic oxidation products with a solvent such as pentane or petroleum ether to obtain a "pentane-soluble" fraction from which "pentane-insoluble" constituents which would otherwise inhibit the emulsion polymerization have been removed.

The above treatments may be performed separately or in combination with each other, and the order in which they are performed, if more than one such treatment is employed, may be varied as desired. The functions or beneficial effects of the various treatments may overlap, so that it may not be desirable to perform such overlapping treatments in combination with each other. Generally, highly satisfactory results are obtained with deoiling followed by distillation, and other treatments such as hydrogenation are not necessary though they provide some advantage.

EXAMPLE I

In this example, a petroleum fraction was partially oxidized to obtain an oxidation product having a saponification number of about 121, and unoxidized petroleum was removed from the oxidation products to obtain an acidic product having a saponification number of about 141. This acidic product was distilled under 1 to 3.5 mm. Hg pressure to obtain an initial —34 percent distillate boiling between 194° F. at 1 mm. Hg and 450° F. at 3.5 mm. Hg. This distillate was saponified with potassium hydroxide to obtain an emulsifying agent which was then used in emulsion polymerization of butadiene-1,3 and styrene.

The petroleum fraction used was a foots oil obtained in the deoiling of a distillate from slack wax, the latter having been obtained in the dewaxing of a solvent-refined lubricating oil. The distillate had boiling range of 325–650° F. at 10 mm Hg. The deoiling was accomplished by dissolving the distillate in a solvent comprising methyl ethyl ketone and benzene at a relatively high temperature, cooling to about 32° F., and filtering at that temperature to obtain a filtrate containing foots oil and solvent. By stripping solvent from the filtrate a foots oil was obtained having average molecular weight of about 436, cloud point of about 74° F., viscosities at 100° F. and 210° F. of about 32.7 and 5.6 centistokes (about 151 and 44 S. U. seconds) respectively, refractive index $N_\alpha^{20°}$ of 1.4727, and density $D_4^{20}$ of 0.8552. The foots oil contained about 10 percent aromatic compounds, about 80 percent of compounds containing naphthene rings, and about 10 percent of acyclic compounds, and contained an average of about 1.4 naphthenic rings per molecule. The paraffinic side chains in compounds containing naphthene rings constituted about 60 percent of the foots oil, the naphthene rings themselves constituting about 20 percent of the foots oil.

The oxidation of the foots oil was conducted by heating to about 285° F. in the absence of a special catalyst. A portion of the oxidation charge was a recycle oil from a previous oxidation of foots oil, and this recycle oil had a catalytic effect on the oxidation so that an additional catalyst was not required. The foots oil was maintained at about 285° F. for about 10.5 hours while blowing air therethrough at a rate of about 2 liters per minute per 1000 grams of foots oil. The reaction zone was maintained under a pressure of about 50 p. s. i. g. The oxidation was terminated when the saponification number of the oxidized foots oil had increased to about 121. The oxidized foots oil, having saponification number of about 121 and containing about 70 percent unsaponifiable material, was then saponified with sodium hydroxide and contacted with petroleum naphtha to extract oil from the soaps. The resulting soaps, having saponification number of about 141 and containing about 5 percent oil, were acidified to obtain the corresponding acids constituting deoiled acidic oxidation products and the latter were distilled as described above to obtain a 34% fraction having saponification number of about 148. This fraction was saponified with potassium hydroxide to obtain an emulsifying agent comprising potassium soaps of distillate acidic products of partial catalytic oxidation of petroleum foots oil.

The emulsifying agent thus obtained was employed in emulsion polymerization of butadiene-1,3 and styrene at a closely controlled temperature of 41° F. The polymerization recipe consisted of 72 parts by weight butadiene, 28 parts styrene, 180 parts distilled water; 0.1 part Cumene hydroperoxide as catalyst, 1.72 parts of an iron-pyrophosphate-sugar complex (0.14 part $FeSO_4.7H_2O$, 0.3 part $K_4P_2O_7$, 1.28 parts "Cerelose") as catalyst activator, 0.16 part of a modifier known under the trademark "Sulfole B-8" comprising alkyl mercaptans containing about 15.6 weight percent sulfur, 0.5 part potassium chloride as anticoagulant, 0.1 part of an auxiliary emulsifying agent known under the trademark "Daxad 11" comprising a condensation product of formaldehyde and naphthalene sulfonic acids, and 4.7 parts (dry basis) of the emulsifying agent prepared as described from oxidation products of foots oil.

During the polymerization, the polymerization mixture was periodically sampled to determine the rate of polymerization. For each sample, the "percent polymerization" was measured by evaporating the sample to dryness, weighing the dried polymer, multiplying the weight of dried polymer by the weight ratio of the original polymerization mixture to the sample, and subtracting the weight of solids in the original polymerization mixture from the multiplication product to obtain the total weight of polymer formed. This total weight is numerically equal to the percent polymerization, based on the original weight of butadiene and styrene, since the latter weight was 100 parts.

The following table shows the percent polymerization obtained after various periods of time had elapsed since the beginning of the polymerization:

| Time in hours: | Percent polymerization |
|---|---|
| 3.5 | 13 |
| 5.5 | 21 |
| 10.5 | 46 |
| 15.0 | 65 |

This example shows that an emulsifying agent comprising alkali metal soap of distillate acids obtained by oxidation of petroleum foots oil is suitable for use in emulsion polymerization of butadiene-1,3 and styrene.

In order to compare the results obtained above with those obtained employing deoiled acidic oxidation products, without any previous distillation such as that employed above, the deoiled acidic oxidation products were directly saponified with potassium hydroxide, and the saponified product obtained was employed in an emulsion polymerization run similar to that disclosed in the above example. The difference between the two runs thus resided in the fact that in the first run, as reported in the above example, the emulsifying agent was obtained by saponifying a 0-34 percent distillate from the deoiled acidic oxidation products, whereas in the second run, reported below, the emulsifying agent was obtained by saponifying the entire deoiled acidic oxidation products. The results obtained in the second run were as follows:

| Time in hours: | Percent polymerization |
|---|---|
| 4.5 | 5 |
| 12 | 12 |

The latter results show that a substantially slower polymerization rate is obtained with an emulsifying agent prepared by saponifying the entire deoiled acidic oxidation product; therefore, preferably, the acidic oxidation products are distilled before preparation of the emulsifying agent for use in emulsion polymerization.

EXAMPLE II

In this example, the oxidation charge was the next lighter distillate fraction from slack wax than the 325–650° F./10 mm. Hg fraction from which the foots oil oxidized in Example I was prepared; the distillate of the present example had initial boiling point of about 600° F. at atmospheric pressure, endpoint of 650° F./10 mm. Hg, and an average molecular weight of about 285 and was employed directly as oxidation charge. The distillate of the present example also had lower molecular weight than the foots oil of Example I, the viscosity of the present distillate being 7.1 centistokes at 100° F. and 2.2 centistokes at 210° F. The present distillate had fewer naphthenic rings per molecule than the foots oil of Example I, the average number of rings being 0.5 for the present distillate, as compared with 1.4 for the foots oil of Example I.

The present distillate was oxidized at 260° F. and atmospheric pressure for 24 hours. No catalyst or recycle oil was employed. The air rate was 2 liters per minute per 1000 grams of charge. The charge was oxidized to 72 saponification number, the oxidation products were distilled to obtain a 0-92 percent distillate fraction, which was then saponified and deoiled. The saponified, deoiled distillate was acidified to obtain the corresponding acidic oxidation products, and the latter were distilled to obtain a 0-88 percent distillate boiling between 302° F. and 401° F. at 2.2 mm. Hg and having a saponification number of 199 and acid number of 194. The distillate was saponified with potassium hydroxide, and the resulting soaps were employed in emulsion polymerization of butadiene and styrene under conditions similar to those used in Example I. The following results were obtained:

| Time in hours: | Percent polymerization |
|---|---|
| 2.5 | 21 |
| 4.6 | 29 |
| 5.8 | 39 |
| 8.6 | 59 |

This example shows that an emulsifying agent comprising alkali metal soap of distillate acids obtained by oxidation of a distillate from slack wax is highly satisfactory for use in emulsion polymerization of butadiene and styrene, and provides more rapid polymerization than soaps of distillate acids obtained by oxidation of a higher molecular weight material obtained from slack wax but containing less wax and having a greater average number of naphthenic rings per molecule. Because of this superiority of the materials prepared from relatively low molecular weight materials, it is preferred that the oxidation charge stock have average molecular weight not greater than 400, although as shown in Example I, charge stocks having molecular weight in the range 400–450 are capable of providing satisfactory materials for use in emulsion polymerization.

In the above examples, the emulsifying agents used in emulsion polymerization were soaps of acidic materials obtained by distilling deoiled products of oxidation of wax-bearing materials. In one embodiment of the invention, an additional step in the preparation of the acidic materials involves hydrogenation of the deoiled soaps prior to distillation. For example, the deoiled soaps prepared as described in Example II can be hydrogenated in an autoclave at 1500 p. s. i. g. and 150–200° C. for several hours in the presence of 5 parts by weight of Raney nickel per 95 parts of soap, and afterward acidified and the resulting acidic products distilled to obtain a distillate fraction boiling between 120° C. and 180° C. at 4 mm. Hg and having a saponification number of 192. Alkali metal soaps of the distillate obtained have been found to be highly suitable for use as emulsifying agent in polymerization of butadiene compounds.

Although, in the above examples, butadiene and styrene copolymers are used as examples of polymers of butadiene-1,3 compounds prepared by emulsion polymerization in the presence of emulsifiers according to the present invention, the present invention can also be used in processes wherein copolymers of butadiene and acrylic acid nitrile, or of butadiene and methyl methacrylate, or of isoprene and styrene, or polymers of butadiene, chloroprene or isoprene are prepared by emulsion polymerization, or when other polymerizations of butadiene-1,3 compounds are conducted. Emulsifying agents according to the invention may be used in conjunction with any suitable known polymerization catalyst initiator, or other polymerization aid.

Although in the above examples, the emulsifying agent was prepared by oxidation of foots oil or a distillate from slack wax, it is to be understood that emulsifying agents for use according to the invention can be prepared by partial oxidation of other petroleum fractions such as dearomatized or partially dearomatized gas oil, lubricating oil, etc. Preferred oxidation charges, however, are slack waxes, distillates therefrom, or foots oils obtained from such slack waxes or distillates.

In the emulsion polymerization, any suitable temperature may be employed. Commonly used temperatures include 0° F., 14° F., 41° F., and 122° F. Preferred temperatures for use according to the invention are those below 100 F. When the temperature is below 32° F., it is generally necessary to employ a somewhat different polymerization formula than that employed in polymerizations above 32° F. One difference resides in the use, at temperatures below 32° F., of a suitable anti-freeze material, such as methanol. Suitable polymerization mixtures for various polymerization temperatures are known in the art.

The emulsifying agent employed according to the invention may be potassium soaps, as in the above example, or it may be other alkali metal soap, e. g. sodium. However, when the polymerization temperature is below 32° F., potassium soaps are preferably used, since sodium soaps do not generally give as satisfactory results.

The concentration of emulsifying agent in the polymerization mixture varies according to the polymerization speed desired; higher concentrations generally resulting in more rapid polymerizations. Preferably, the total amount of soap emulsifier in the mixture is within the approximate range 1–8 parts of soap per 180 parts of water. The emulsifying agent employed according to the invention can be used either as the sole soap emulsifying agent, or it can be used in admixture with other soap emulsifying agents, such as fatty acid soap, disproportionated rosin soap, soap of petroleum naphthenic acids.

*Comparison example*

A polymerization similar to that described in Example I, but using 4.7 parts of "KORR Soap," a mixture of potassium soaps of partially hydrogenated tallow fatty acids, instead of the 4.7 parts of oxidation products soaps, was performed. Precipitation of solid polymer in the polymerization mixture occurred at 40–45% polymerization. The polymerization runs in Examples I and II, on the other hand, resulted in no precipitation of solid polymer up to 65% polymerization, at which point the polymerization was terminated. The following table gives a comparison of the results obtained:

| Emulsifier: | Precipitation of polymer |
| --- | --- |
| According to the invention | None up to 65% polymerization. |
| KORR Soap | Precipitation at 40–50% polymerization. |

This example shows that the premature precipitation encountered with KORR Soap is avoided according to the invention.

The carboxylic acids employed to make the emulsifying agent for use according to the invention preferably have saponification number, on the oil-free basis, within the approximate range from 160 to 280 mg. of KOH per gram, more preferably 180 to 240 mg. of KOH per gram, since such acids provide particularly good emulsifying agents with regard to polymerization rate as well as freedom from preflocculation. The acids used in Example II had saponification number of 199 mg. of KOH per gram, indicating an average of about 18 carbon atoms per molecule, and provided particularly good polymerization rates, faster than those provided by various fatty and rosin soaps previously used in emulsion polymerization. Thus, for example, in polymerizations conducted as set forth in the preceding examples, sodium oleate and sodium soaps of disproportionated rosin acids have each provided 60% polymerization in about 10.5 hours, as compared with about 9 hours in Example II.

This application is a continuation-in-part of copending application Serial No. 308,518, filed September 8, 1952, and now abandoned, by the present inventors.

The invention claimed is:

1. Process for polymerization of butadiene compounds which comprises: subjecting such compounds in aqueous emulsion to polymerizing conditions in the presence of an emulsifying agent containing not more than 15 weight percent unsaponifiable material and comprising alkali metal soap of acidic material comprising carboxylic acids having mainly 12 to 26 carbon atoms obtained by partial oxidation of a petroleum fraction having average molecular weight in the range 200 to 450.

2. Process according to claim 1 wherein said acidic material is obtained by distilling the acidic products of said partial oxidation to obtain said acidic material as distillate.

3. Process according to claim 1 wherein said acidic material is obtained by hydrogenating the acidic products of said partial oxidation to obtain said acidic material.

4. Process according to claim 1 wherein said alkali metal is potassium.

5. Process according to claim 1 wherein said acidic material has a distillation endpoint not greater than 550° F. at 3.5 mm. Hg.

6. Process according to claim 1 wherein said petroleum fraction has an average of at least 0.4 naphthenic rings per molecule.

7. Process according to claim 1 wherein said petroleum is a distillate from slack wax.

8. Process according to claim 1 wherein said petroleum fraction is a foots oil obtained in the deoiling of a distillate from slack wax.

9. Process for polymerization of butadiene compounds which comprises: subjecting such compounds in aqueous emulsion to polymerizing conditions in the presence of an emulsifying agent comprising alkali metal soap of acidic material boiling within the range 150° F./1 mm. Hg to 550° F./3.5 mm. Hg, comprising mainly carboxylic acids having 12 to 26 carbon atoms, and containing not more than 15 weight percent of unsaponifiable material, said acidic material having been prepared by oxidizing a petroleum fraction having average molecular weight in the range 250 to 400 and containing an average of at least 0.4 naphthenic rings per molecule until the saponification number of the oxidation mixture is in the range 50 to 125, saponifying the oxidation mixture, removing unsaponifiable material from the saponified oxidation mixture by contact with a solvent for unsaponifiable material, acidifying the resulting raffinate, and vacuum distilling the acidified raffinate to obtain said acidic material as distillate.

10. Process according to claim 1 wherein said acids have saponification number, on the unsaponifiable-free basis, within the approximate range from 160 mg. of KOH per gram to 280 mg. of KOH per gram.

References Cited in the file of this patent

UNITED STATES PATENTS 2,606,890   Polly et al. _____ Aug. 12, 1952

OTHER REFERENCES

Starkweather et al.: "Emulsion Polymerization of Diene Hydrocarbons," I. & E. Chem., vol. 3, No. 2 (1947), p. 211.

Schwartz and Perry: "Surface Active Agents," Interscience, New York, N. Y. (1949), pp. 30–32.